US010824640B1

(12) United States Patent
Chen et al.

(10) Patent No.: US 10,824,640 B1
(45) Date of Patent: Nov. 3, 2020

(54) FRAMEWORK FOR SCHEDULING CONCURRENT REPLICATION CYCLES

(71) Applicant: EMC Corporation, Hopkinton, MA (US)

(72) Inventors: Xiangping Chen, Sherborn, MA (US); Anton Kucherov, Milford, MA (US); David Meiri, Cambridge, MA (US); Kobi Luz, Rehovot (IL); Felix Shvaiger, Brighton, MA (US)

( * ) Notice: Subject to any disclaimer, the term of this patent is extended or adjusted under 35 U.S.C. 154(b) by 374 days.

(21) Appl. No.: 14/982,963

(22) Filed: Dec. 29, 2015

(51) Int. Cl.
*G06F 16/27* (2019.01)
*G06F 9/50* (2006.01)

(52) U.S. Cl.
CPC ............ *G06F 16/27* (2019.01); *G06F 9/5005* (2013.01)

(58) Field of Classification Search
USPC ......................................................... 707/706
See application file for complete search history.

(56) References Cited

U.S. PATENT DOCUMENTS

| 9,317,213 | B1* | 4/2016 | Gupta et al. ............ G06F 17/30 707/638 |
| 9,338,228 | B1* | 5/2016 | Dantkale et al. |
| 2005/0278385 | A1* | 12/2005 | Sutela ............... G06F 17/30578 |
| 2013/0339295 | A1* | 12/2013 | Dean .................... G06F 3/0611 707/610 |

* cited by examiner

*Primary Examiner* — Muluemebet Gurmu
(74) *Attorney, Agent, or Firm* — Krishnendu Gupta; Anne-Marie Dinius

(57) ABSTRACT

A system, computer program product, and computer-executable method of scheduling replication on a data storage system, the system, the computer program product, and computer-executable method including receiving a request to replicate a portion of data stored on the data storage system, dividing the portion of data into a plurality of portions, scheduling replication of each of the plurality of portions, and replicating each of the plurality of portions.

6 Claims, 7 Drawing Sheets

FIG. 2A

Scheduling Queue 200

| Task Name | Status | Priority | TaskID |
|---|---|---|---|
| | | | |
| | | | |
| | | | |
| | | | |
| | | | |
| | | | |
| | | | |
| | | | |
| | | | |
| | | | |

FIG. 2B

Scheduling Queue 200

| Task Name | Status | Priority | TaskID |
|---|---|---|---|
| Replication Slice 1 | Pending | 1 | 0001 |
| Replication Slice 2 | Pending | 1 | 0001 |
| Replication Slice 3 | Pending | 1 | 0001 |
| Replication Slice 4 | Pending | 1 | 0001 |
| Replication Slice 5 | Pending | 1 | 0001 |
| Replication Slice 6 | Pending | 1 | 0001 |
| Replication Slice 7 | Pending | 1 | 0001 |
| Replication Slice 8 | Pending | 1 | 0001 |
| Replication Slice 9 | Pending | 1 | 0001 |
| Replication Slice 10 | Pending | 1 | 0001 |

FIG. 2C

Scheduling Queue 200

| Task Name | Status | Priority | TaskID |
|---|---|---|---|
| Replication Slice 1 | Completed | - | 0001 |
| Replication Slice 2 | In Process | active | 0001 |
| Replication Slice 3 | In Process | active | 0001 |
| Job X | Pending | 1 | 0002 |
| Replication Slice 4 | Pending | 2 | 0001 |
| Job Y | Pending | 2 | 0003 |
| Replication Slice 5 | Pending | 2 | 0001 |
| Replication Slice 6 | Pending | 2 | 0001 |
| Replication Slice 7 | Pending | 2 | 0001 |
| Replication Slice 8 | Pending | 2 | 0001 |
| Replication Slice 9 | Pending | 2 | 0001 |
| Replication Slice 10 | Pending | 2 | 0001 |

FIG. 2D

Scheduling Queue 200

| Task Name | Status | Priority | TaskID |
|---|---|---|---|
| Replication Slice 1 | Completed | - | 0001 |
| Replication Slice 2 | In Process | Active | 0001 |
| Replication Slice 3 | Completed | - | 0001 |
| Job X | Completed | - | 0002 |
| Replication Slice 4 | In Process | Active | 0001 |
| Job Y | Pending | 1 | 0003 |
| Replication Slice 5 | Pending | 1 | 0001 |
| Replication Slice 6 | Pending | 1 | 0001 |
| Replication Slice 7 | Pending | 1 | 0001 |
| Replication Slice 8 | Pending | 1 | 0001 |
| Replication Slice 9 | Pending | 1 | 0001 |
| Replication Slice 10 | Pending | 1 | 0001 |

FIG. 2E

Scheduling Queue 200

| Task Name | Status | Priority | TaskID |
|---|---|---|---|
| Replication Slice 1 | Completed | - | 0001 |
| Replication Slice 2 | In Process | Active | 0001 |
| Replication Slice 3 | Completed | - | 0001 |
| Job X | Completed | - | 0002 |
| Replication Slice 4 | Completed | - | 0001 |
| Job Y | Completed | - | 0003 |
| Replication Slice 5 | Completed | - | 0001 |
| Replication Slice 6 | Completed | - | 0001 |
| Replication Slice 7 | Completed | - | 0001 |
| Replication Slice 8 | Completed | - | 0001 |
| Replication Slice 9 | Completed | - | 0001 |
| Replication Slice 10 | In Process | Active | 0001 |

FRAMEWORK FOR SCHEDULING CONCURRENT REPLICATION CYCLES

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method of scheduling replication on a data storage system, the system, the computer program product, and computer-executable method including receiving a request to replicate a portion of data stored on the data storage system, dividing the portion of data into a plurality of portions, scheduling replication of each of the plurality of portions, and replicating each of the plurality of portions.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIGS. 2A-2E are state diagrams of a global scheduling queue of a distribute system (shown in FIG. 1), in accordance with an embodiment of the present disclosure;

Like reference symbols in the various drawings indicate like elements.

DETAILED DESCRIPTION

Figure 1:
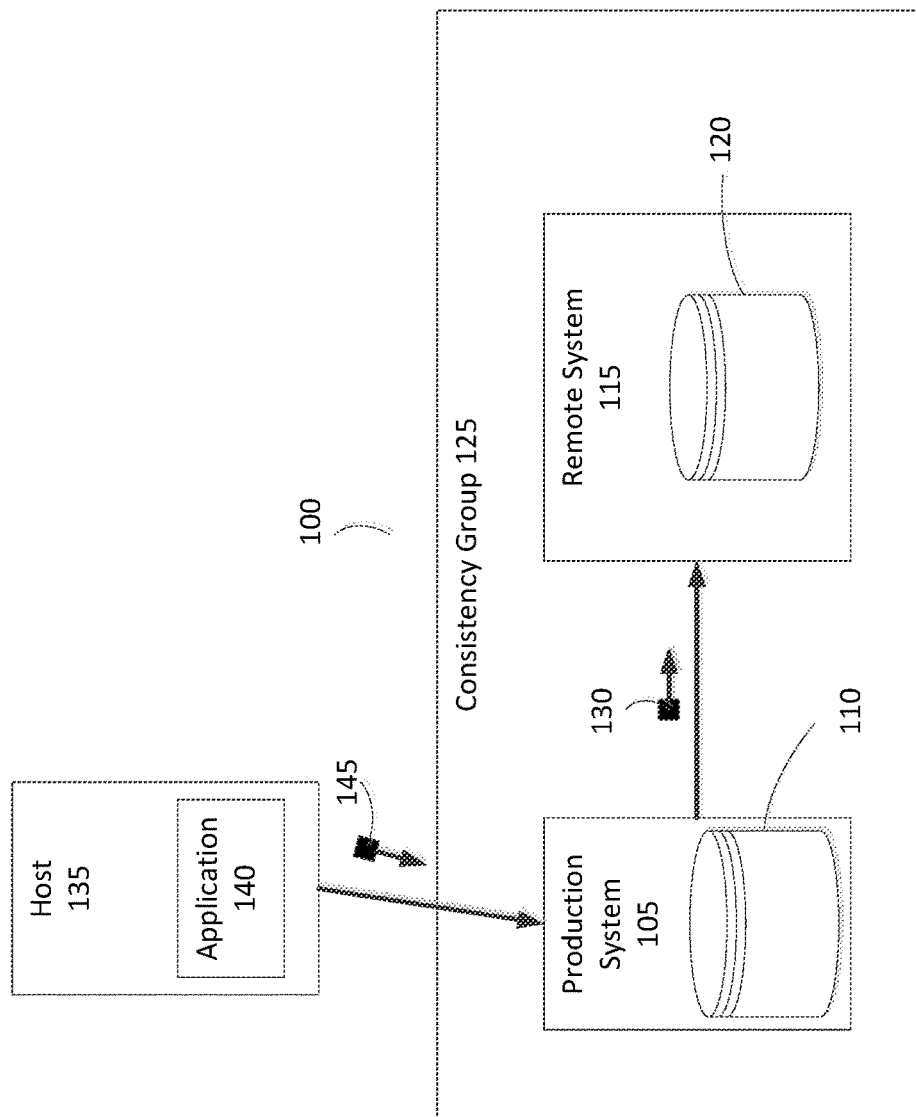
FIG. 1 is a simplified illustration of a distributed system replicating data from a production system to a remote system, in accordance with an embodiment of the present disclosure.

Traditionally, many distributed systems use a consistent snapshot mechanism to replicate data between a source site and a remote site. Typically, replication of one or more snapshots is a large task that may take a large amount of time to complete. Generally, once a distributed system initiates a replication task, the distributed system dedicates resources to the replication task until the task is complete. Conventionally, improvements to scheduling mechanisms for replication would be beneficial to the data storage industry.

In many embodiments, the current disclosure may enable a distributed system to efficiently process and/or schedule replication of data within the distributed system. In various embodiments, the current disclosure may enable a distributed system to balance large replication tasks with other replication tasks and/or other service level objectives. In certain embodiments, the current disclosure may enable a distributed system to progress on one or multiple tasks based on priorities. In most embodiments, as task priorities change, the current disclosure may enable a distributed system to adjust priorities of one or multiple tasks and/or replication processes being completed by the distributed system.

Snapshot Mechanism

The present embodiments relate in one aspect to a snapshot of a thinly provisioned volume or other logical data construct, which snapshot comprises metadata relating to changed parts of the address range only in relation to an ancestor, and is thus in itself only thinly provisioned. The snapshot may be part of a hierarchy of snapshots wherein the metadata for a given location may be placed at the point in which it first appears in the hierarchy and which metadata is pointed to by later snapshots.

According to an aspect of some embodiments of the present invention there is provided a memory management system for a memory volume, the system comprising a snapshot provision unit configured to take a given snapshot of the memory volume at a given time, the snapshot comprising a mapping table and memory values of the volume, the mapping table and memory values comprising entries for addresses of the physical memory containing data, which values entered differ from an ancestor of the snapshot.

In an embodiment, the volume is a thinly provisioned memory volume in which a relatively larger virtual address range of virtual address blocks is mapped to a relatively smaller physical memory comprising physical memory blocks via a mapping table containing entries only for addresses of the physical memory blocks containing data.

In an embodiment, the given snapshot is part of a hierarchy of snapshots taken at succeeding times, and wherein the snapshot provision unit is configured to provide the entries to the given snapshot for addresses of the physical memory to which data was entered subsequent to taking of a most recent previous snapshot in the hierarchy, and to provide to the given snapshot pointers to previous snapshots in the hierarchy for data entered prior to taking of a most recent previous snapshot.

In an embodiment, the snapshot provision unit is configured to create a read-only version of the thinly provisioned memory volume to provide a fixed base for the hierarchy.

In an embodiment, the snapshot provision unit is configured to provide a first tree structure of the hierarchy to indicate for each written memory block a most recent ancestor snapshot of a queried snapshot containing a respective entry.

In an embodiment, the snapshot provision unit comprises a read function which traverses the first tree structure to read a value of a given block, and a write function which writes a block value to a most recent snapshot in the hierarchy.

In an embodiment, the snapshot provision function is configured to provide a second tree structure, the second tree structure indicating, for each written memory block, which level of the hierarchy contains a value for the block.

In an embodiment, the snapshot provision unit comprises a read function configured to traverse the second memory structure to find a level of the hierarchy containing a value for a requested block and then to use the first memory structure to determine whether the level containing the value is an ancestor in the hierarchy of a level from which the block was requested.

In an embodiment, the snapshot provision unit further comprises a delete function for deleting snapshots, wherein for a snapshot to be deleted which has a single sibling, values of sibling and parent nodes are merged into a single node.

In an embodiment, the physical memory comprises random access memory disks.

In an embodiment, the blocks are of a granularity of one member of the group consisting of less than 100 k, less than 10 k and 4 k.

In an embodiment, the snapshot provision unit is configured to align mapping data of a respective snapshot to a page of memory.

In an embodiment, the snapshot provision unit is configured to provide a third tree structure, the third tree structure returning a Depth-First Search ordering of respective snapshots of the hierarchy, such that leaves of each snapshot are ordered consecutively and that if a snapshot A is an ancestor of a snapshot B then the ordering of leaves of A completely overlaps that of B.

In an embodiment, the snapshot provisioning unit is configured with a read function, the read function configured to use the third tree structure to obtain a list of snapshots having a value at a requested memory address, and to find a closest ancestor in the list of a requesting snapshot by traversing the snapshots of the list and returning a respective snapshot of the list which is an ancestor of the requesting snapshot and has a minimum number of leaves.

In an embodiment, the snapshot provision unit is configured to provide an indirection layer or a look-aside table to provide data deduplication.

According to a second aspect of the present invention there is provided a memory management method comprising taking a given snapshot of a memory volume at a given time, providing the snapshot with a mapping table and memory values of the volume, the mapping table and memory values comprising entries for addresses of the physical memory containing data, and wherein the values differ from data in an ancestor.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

More information regarding snapshot mechanisms may be found in U.S. patent application Ser. No. 13/470,317 entitled "Snapshot Mechanism" which is commonly assigned herewith and incorporated by reference herein.

Hash-Based Replication

In a Content Addressable Storage (CAS) array, data is stored in blocks, for example of 4 KB, where each block has a unique large hash signature, for example of 20 bytes, saved on Flash memory. As described herein, hash signatures are accessed by small in-memory handles (Called herein short hash handles), for example of 5 bytes. These handles are unique to each array, but not necessarily unique across arrays. When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it is faster to send the data without a hash signature, and let the target calculate the hash signature.) While the short hash handles are readily available without the need to read from Flash, since the short hash handles are not unique, they cannot be easily used to check if a target contains a hash signature. In some implementations, short hash handles are shortcuts for hash signatures, and can give a reliable hint of the existence of a hash signature in an array. Described herein is an approach to use these short hash handles, verify them through the hash signature, and send the data as needed. While the description describes using this approach with de-duplication storage devices, it would be appreciated by one of ordinary skill in the art that the approach described herein may be used with any type of storage device including those that do not use de-duplication.

The examples described herein include a networked memory system. The networked memory system includes multiple memory storage units arranged for content addressable storage of data. The data is transferred to and from the storage units using separate data and control planes. Hashing is used for the content addressing, and the hashing produces evenly distributed results over the allowed input range. The hashing defines the physical addresses so that data storage makes even use of the system resources.

A relatively small granularity may be used, for example with a page size of 4 KB, although smaller or larger block sizes may be selected at the discretion of the skilled person. This enables the device to detach the incoming user access pattern from the internal access pattern. That is to say the incoming user access pattern may be larger than the 4 KB or other system-determined page size and may thus be converted to a plurality of write operations within the system, each one separately hashed and separately stored.

Content addressable data storage can be used to ensure that data appearing twice is stored at the same location. Hence unnecessary duplicate write operations can be identified and avoided. Such a feature may be included in the present system as data deduplication. As well as making the system more efficient overall, it also increases the lifetime of those storage units that are limited by the number of write/erase operations.

The separation of Control and Data may enable a substantially unlimited level of scalability, since control operations can be split over any number of processing elements, and data operations can be split over any number of data storage elements. This allows scalability in both capacity and performance, and may thus permit an operation to be effectively balanced between the different modules and nodes.

The separation may also help to speed the operation of the system. That is to say it may speed up Writes and Reads. Such may be due to:

(a) Parallel operation of certain Control and Data actions over multiple Nodes/Modules (b) Use of optimal internal communication/networking technologies per the type of operation (Control or Data), designed to minimize the latency (delay) and maximize the throughput of each type of operation.

Also, separation of control and data paths may allow each Control or Data information unit to travel within the system between Nodes or Modules in the optimal way, meaning only to where it is needed and if/when it is needed. The set of optimal where and when coordinates is not the same for control and data units, and hence the separation of paths ensures the optimization of such data and control movements, in a way which is not otherwise possible. The separation is important in keeping the workloads and internal communications at the minimum necessary, and may translate into increased optimization of performance.

De-duplication of data, meaning ensuring that the same data is not stored twice in different places, is an inherent effect of using Content-Based mapping of data to D-Modules and within D-Modules.

Scalability is inherent to the architecture. Nothing in the architecture limits the number of the different R, C, D, and H modules which are described further herein. Hence any number of such modules can be assembled. The more modules added, the higher the performance of the system becomes and the larger the capacity it can handle. Hence scalability of performance and capacity is achieved.

More information regarding Hash-Based Replication may be found in U.S. patent application Ser. No. 14/037,577 entitled "Hash-Based Replication" which is commonly assigned herewith and incorporated by reference herein.

Framework for Scheduling Concurrent Replication Cycles

In many embodiments, Asynchronous snapshot based remote replication may provide data protection against site disaster with minimal impact to host I/O performance. In various embodiments, remote replication may work by creating snapshots, calculating differences between the snapshots, periodically transferring differences to a remote system, and reconstructing the data content on the remote system. In certain embodiments, once a user sets up a replication pairing relationship, a distributed system may automatically schedule data transfers without user intervention. In some embodiments, a complete delta data transfer may be called a replication cycle. In most embodiments, a distributed system may schedule multiple replication cycle transfers for different replication pairs at the same time, especially in high performance systems where time intervals between cycles may be very short (i.e. measured in seconds). In these embodiments, it becomes a challenge to ensure fairness, priorities, Service Level Objectives (SLO), and other Quality of Service (QoS) policies among overlapped replication cycles. In some embodiments, different replication cycle tasks may vary a lot in terms of resource requirements, such as CPU, network bandwidth, memory buffer, and/or other data storage resources which may be available.

In many embodiments, the current disclosure may enable a distributed system to efficiently process and/or schedule replication of data within the distributed system. In various embodiments, the current disclosure may enable a distributed system to balance large replication tasks with other replication tasks and/or other service level objectives. In certain embodiments, the current disclosure may enable a distributed system to progress on one or multiple tasks based on priorities. In most embodiments, as task priorities change, the current disclosure may enable a distributed system to adjust priorities of one or multiple tasks and/or replication processes being completed by the distributed system.

In most embodiments, a distributed system may include one or more data storage arrays. In various embodiments, a data storage array may be content addressable data storage. In certain embodiments, a distributed system may be enabled to use one or more data storage arrays as a production system and/or a remote system for data storage. In some embodiments, hosts, applications, and/or users may be enabled to use a production system to store data. In other embodiments, hosts, applications, and/or users may be enabled to use a distributed system to replicate data from a production system to a remote system.

In many embodiments, a distributed system may be enabled to manage scheduling of one or more replication tasks from a production system to a remote system. In various embodiments, a distribute system may receive a request to replicate data on a production system. In some embodiments, a distributed system may be enabled to globally schedule a requested replication where one or a plurality of devices within a distributed system may be enabled to process the requested replication. In most embodiments, a distributed system may be enabled to divide a replication task into multiple portions and may be enabled to schedule each of the multiple portions of a replication task. In various embodiments, multiple portions may include 10, 100, 1000, 10000 portions.

In some embodiments, a distributed system may divide a replication task into 1024 portions. In this embodiment, a distributed system may schedule each of the 1024 portions within a global scheduler for the distributed system. One or more devices within the distributed system may be enabled to provide one or more threads enabled to process tasks within the global schedule. In this embodiment, as there are 1024 slices of a replication task scheduled, a distributed system may be enabled to process the replication task without locking up all of a distributed system's resources processing a single replication task. In most embodiments, a distributed system may be enabled to dynamically prioritize different tasks (new tasks and previously scheduled tasks) to facilitate service level objectives that a distributed system may be attempting to complete. For example, in an embodiment, if a distributed system has a service level objective to complete each replication within one hour and currently has 3 replication tasks executing concurrently, the distributed system may be enabled to provide more threads/processing power to one or more of the tasks depending on how quickly each task may be completed. If one task may be expected to be completed in 10 minutes, one task may be expected to be completed in 30 minutes, and one task may be expected to be completed in 70 minutes at the current allocation of resources, a distributed system may be enabled to modify priorities of slices of each of the replication tasks, such that slices of the 10 minute task may be given a lower priority and slices of the 70 minute task may be given a higher priority to complete all tasks within the one hour time frame.

In most embodiments, a distributed system may be enabled to divide each replication task into 1024 evenly distributed work unites (slices) based on a subset of logical address space. In certain embodiments, a slice may be a portion of an entire replication task. In various embodiments, a slice and/or portion may be a sub-task created by dividing a replication task into smaller pieces. In some embodiments, a replication task may be a request to replicate data from one or more production site(s) to a remote site(s). In other embodiments, an application may initiate a replication task. In some embodiments, a distributed system may be configured to automatically initiate replication tasks on a schedule and/or periodically. In various embodiments, a distributed system may be enabled to evenly distribute slices to nodes and/or modules within the distributed system. In certain embodiments, global priority scheduling queue may be maintained in each device within a distributed system to keep track of all the replication task configuration, scheduling priorities, and progress information. In some embodiments, a pool of worker threads may be utilized to complete tasks within the global scheduling queue. In many embodiments, upon finishing a slice, a thread may update its current task progress and may go to the global scheduling queue to get the next slice to work on. In various embodiments, a thread may continue until all tasks are completed. In certain embodiments, a thread may sleep and then wait for the next replication cycle task to be scheduled. In some embodiments, semaphores may independently count completion of slices, worker threads, and messages, and they may be enabled to all complete asynchronously without creating dependencies among the resources.

In most embodiments, the framework described by the current disclosure may allow for maximum flexibility in task scheduling in an efficient manner. In various embodiments, the framework described by the current disclosure may be enabled to ensure fairness so that CPU intensive scan tasks do not wait behind bandwidth intensive scan tasks. In some embodiments, the current disclosure may also allow for QoS and prioritized scheduling, and may provide mechanisms to track progress and aborted tasks.

In many embodiments, a replication management system within a distributed system may request to start a replication task based on a Replication policy. In various embodiments, a distributed system may divide a replication task into multiple portions and update a global scheduling queue with the slices of the divided replication task. In some embodiments, a distributed system may wake up all worker threads that may be sleeping. In certain embodiments, as a worker thread wakes up, the thread may go through a global scheduling queue to get the next highest priority task to work on. In some embodiments, once a thread receives a task, the thread may allocate working buffer memory based on a replication snapshot chain configuration. In many embodiments, a thread may be enabled to advance the slice cursor within a global scheduling queue until it finds the next slice to work on. In various embodiments, a thread may start scanning a snapshot to determine differences form the previous snapshot and replication each of the differences found. In some embodiments, once a thread finishes scanning a slice, the thread may check if it is the last thread working on a specific replication task (i.e., cursor reaches to the end, task aborted, encountered error, and if and only if itself is still working on the task). In certain embodiments, upon determining that no other threads are working on a specified replication task, the thread notifies the distributed system that replication is completed. In other embodiments, a thread may continue acquiring tasks until a global scheduler may be completely empty and at that point, the thread may sleep until a new replication task may be added to the global scheduler.

Refer to the example embodiment of FIG. 1. FIG. 1 is a simplified illustration of a distributed system replicating data from a production system to a remote system, in accordance with an embodiment of the present disclosure. Distributed system 100 includes production system 105 and remote system 115. Production system 105 and remote system 115 are in consistency group 125 at data is replicated from production system 105 to remote system 115 asynchronously. Production system 105 includes volume 110 which stores data from application 140 executing on host 135. Remote system 115 includes volume 120 and receives replicated data from production system 105. Distributed system 100 is enabled to schedule one or multiple replication tasks. In this embodiment, distributed system 100 is enabled to receive a request to start remote replication from application 140 on host 135. Distributed system 100 is enabled to divide a replication task into multiple slices and schedule the multiple slices on a global scheduling queue to be completed by one or more devices providing resources within distributed system 100. In many embodiments, resources provided within a distributed system may be in the form of threads, bandwidth, CPU, buffer memory, and/or other computing/networking resources which may facilitate replication between a production system and a remote system.

Refer to the example embodiments of FIGS. 2A-2E. FIGS. 2A-2E are state diagrams of a global scheduling queue of a distribute system (shown in FIG. 1), in accordance with an embodiment of the present disclosure. FIG. 2A is a first state of scheduling Queue 200 which is a part of distributed system 100 (FIG. 1) that enables distribute system 100 to manage one or multiple replication and/or other tasks simultaneously. As shown in FIG. 2A, Scheduling Queue 200 is empty. In this embodiment, worker threads in distributed system 100 are periodically sleeping until scheduling queue 200 is filled with one or more tasks to complete. In this embodiment, scheduling queue 200 tracks task name, status, priority, and Task ID. Slices and/or tasks that are associated include the same task id. Each task is enabled to have a task name which may be useful to be referenced by a user and/or administrator. Status represents whether a task is pending, active, or completed. In this embodiment, distributed system 100 is enabled to prioritize tasks and/or slices of tasks placed in scheduling queue 200.

FIG. 2B is a second state of scheduling queue 200 shows scheduling queue 200 after a replication task has been received by distributed system 100. In this embodiment, distributed system 100 received a replication request from application 140 (FIG. 1) to configure consistency group 125 to replicate data from production system 105 to remote system 115. FIG. 2B shows Scheduling queue 200 being filled with ten slices of a replication request/configuration from application 140 (FIG. 1). As shown from FIG. 2B, each task has a priority of 1 and associated with TaskID "0001". In many embodiments, a distributed system may divide replication into a plurality of portions to be scheduled by a scheduling queue. In various embodiments, a distributed system may divide a replication task into 10 slices. In some embodiments, a distributed system may divide a replication task into 1024 individual tasks. As shown in FIG. 2B, each of the replication slices shows its associated status, which in this case is "pending."

FIG. 2C shows a third state of scheduling queue 200 after some progress has been made towards completing replication slices 1-10. As shown, distributed system 100 (FIG. 1) has received other tasks to be scheduled, which include "Job X" and "Job Y" which have both received a high priority and therefore has been moved to the top of scheduling queue 200. In this embodiment, replication slice 1 has been completed, replication slice 2 is in process, and replication slice 3 is in process. Every other process referenced in scheduling queue 200 is currently pending and/or waiting for resources from distributed system 100 (FIG. 1). Each task that is associated with another task, in this embodiment, has the same task ID. For example, as shown, each task with the same taskID (i.e., "0001") is associated with each other. In some embodiments, multiple slices with the same task ID may be a replication task split into a plurality of slices. As shown in FIG. 2C, replication slice 2 and replication slice 3 are denoted as being active process. Additionally, priority of each slice within scheduling queue 200 has been updated. "Job X" has been updated with a priority of "1" while every other task currently has a priority of "2".

FIG. 2D shows a fourth state of scheduling queue 200. As shown, distributed system 100 (FIG. 1) has completed replication slice 3 and Job X. A free worker thread in Distributed system 100 has started processing replication slice 4. However, distributed system 100 is still processing replication slice 2. In this embodiment, as the high priority tasks have either already been completed or are in process of being completed, each priority of a pending task as been changed to priority "1".

FIG. 2E shows a fifth state of scheduling queue 200 in distributed system 100 (FIG. 1). In this embodiment, distributed system 100 has completed every task except for replication slice 2 and replication slice 10. The worker thread processing slice 10 checks and determines that it is working on the last portion of the scheduled replication associated with replication slices 1-10. Upon completing replication slice 10, the worker thread waits for every other portion of replication slices 1-10 to be completed. Upon completion of all replication slices 1-10, the worker thread notifies distributed system 100, which enables distributed system 100 to update scheduling queue 200.

Figure 3:
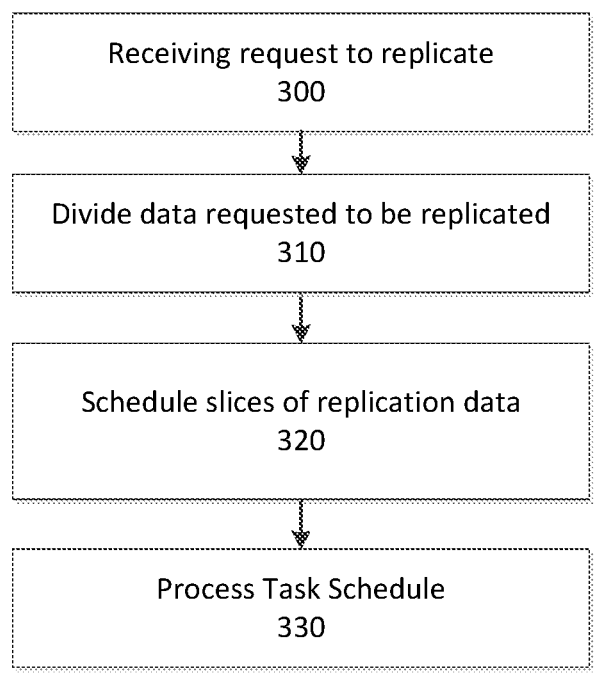
FIG. 3 is a simplified flowchart of a method of managing replication tasks in a distributed system (as shown in FIG. 1), in accordance with an embodiment of the present disclosure.

Refer to the example embodiments of FIGS. 1 and 3. FIG. 3 is a simplified flowchart of a method of managing replication tasks in a distributed system (as shown in FIG. 1), in accordance with an embodiment of the present disclosure. Distributed system 100 includes production system 105 and remote system 115. Production system 105 and remote system 115 are in consistency group 125. production system 105 includes volume 110 and is enabled to receive data from application 140 in host 135. Remote system 115 includes volume 120 and is enabled to receive replication data from production system 105 using message 130.

In this embodiment, distributed system 100 receives a replication request from application 140 (Step 300). In many embodiments, an application, host, user, and/or administrator may configure a distributed system to automatically replicate data. In some embodiments, data may be replicated periodically and/or on specified intervals. Distributed system 100 divides data requested to be replicated into a plurality of portions (Step 310). Distributed system 100 updates schedule queue 200 (shown in FIGS. 2A-E) with each of the plurality of portions (i.e. slices of replication data) (Step 320). Distributed system 100 allocates available threads to process the tasks on schedule queue 200 (Step 330).

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 4:
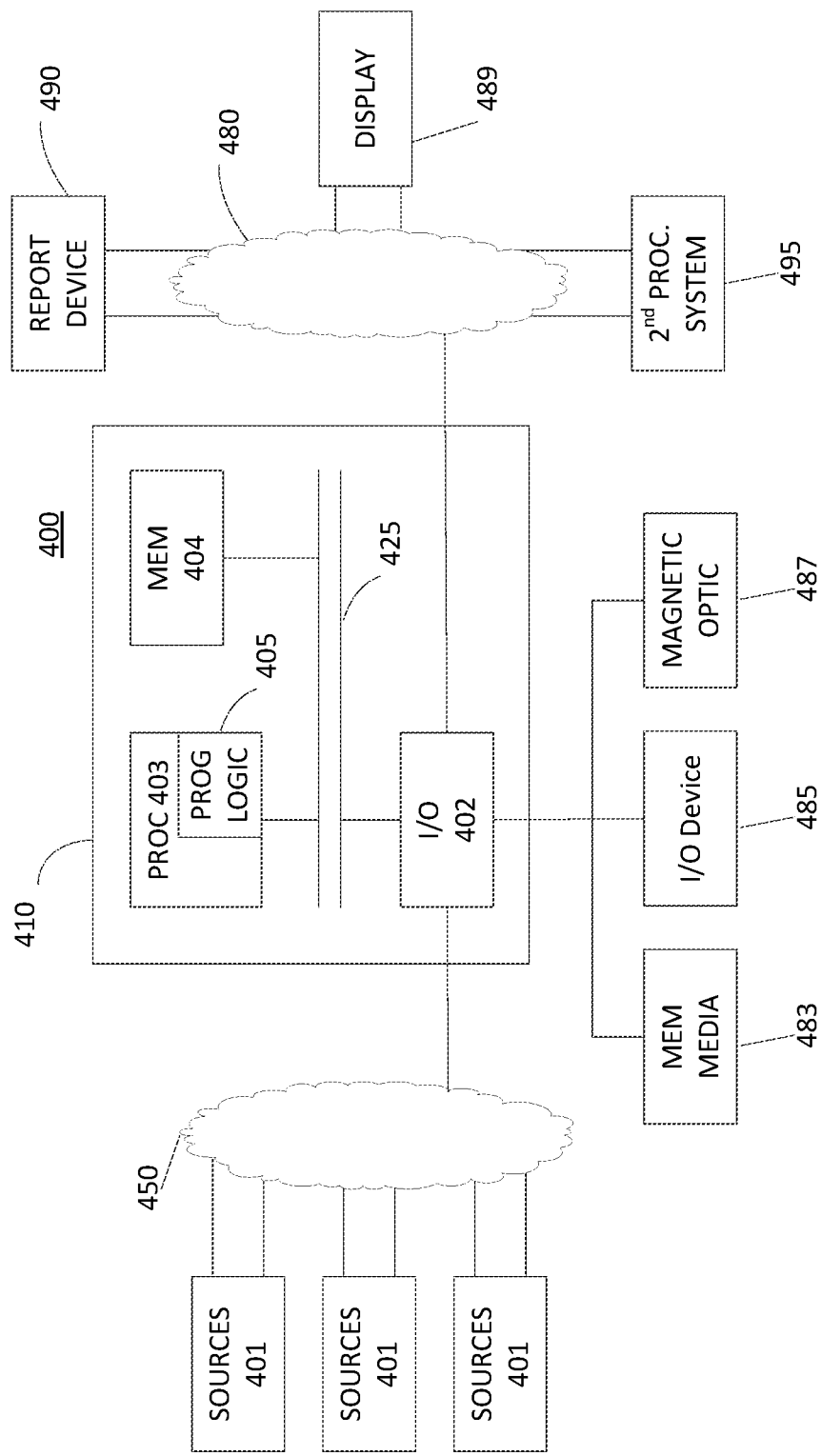
FIG. 4 is an example of an embodiment of an apparatus that may utilize the techniques described herein, in accordance with an embodiment of the present disclosure.

FIG. 4 is a block diagram illustrating an apparatus, such as a computer 410 in a network 400, which may utilize the techniques described herein according to an example embodiment of the present invention. The computer 410 may include one or more I/O ports 402, a processor 403, and memory 404, all of which may be connected by an interconnect 425, such as a bus. Processor 403 may include program logic 405. The I/O port 402 may provide connectivity to memory media 483, I/O devices 485, and drives 487, such as magnetic drives, optical drives, or Solid State Drives (SSD). When the program code is loaded into memory 404 and executed by the computer 410, the machine becomes an apparatus for practicing the invention. When implemented on one or more general-purpose processors 403, the program code combines with such a processor to provide a unique apparatus that operates analogously to specific logic circuits. As such, a general purpose digital machine can be transformed into a special purpose digital machine.

Figure 5:
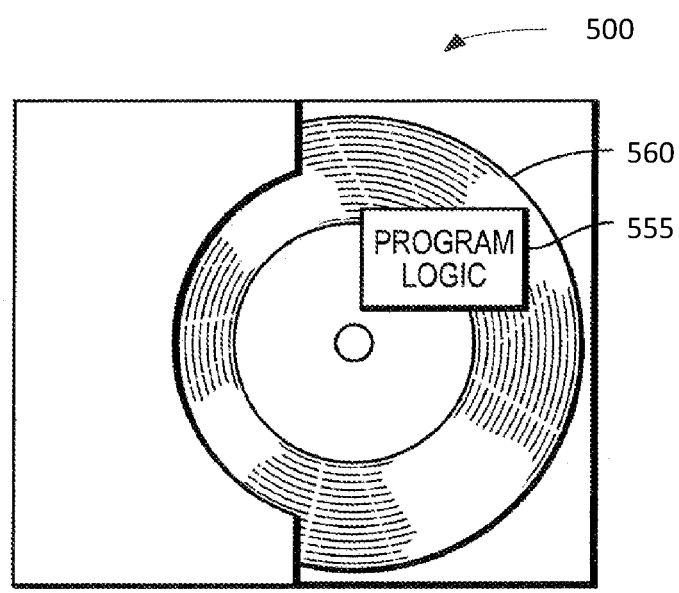
FIG. 5 is an example of a method embodied on a computer readable storage medium that may utilize the techniques described herein, in accordance with an embodiment of the present disclosure.

FIG. 5 is a block diagram illustrating a method embodied on a computer readable storage medium 560 that may utilize the techniques described herein according to an example embodiment of the present invention. FIG. 5 shows Program Logic 555 embodied on a computer-readable medium 560 as shown, and wherein the Logic is encoded in computer-executable code configured for carrying out the methods of this invention and thereby forming a Computer Program Product 500. Program Logic 555 may be the same logic 405 on memory 404 loaded on processor 403 in FIG. 4. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-5. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of scheduling replication on a data storage system, the computer-executable method comprising:
   receiving a request to replicate a portion of data stored on the data storage system;
   assigning a task number and a priority level to the request to replicate, wherein the task number is used to track progress of the replication of the portion of data and the priority level is subject to dynamic alteration;
   evenly dividing the portion of data into a plurality of portions;
   correlating the task number to each of the plurality of portions;
   periodically evaluating all incomplete requests to replicate the plurality of portions in order to dynamically adjust the priority level of each of the plurality of portions;
   scheduling replication of each of the plurality of portions within a global scheduling queue, wherein the scheduling of each of the plurality of portions is dynamically based upon the current priority level assigned to each of the plurality of portions;
   allocating a thread to replicate each of the plurality of portions according to the scheduling;
   balancing each task within the global scheduling queue, wherein execution of replication on each of the plurality of portions does not preclude access to the threads for longer than an amount of time to complete one slice of the plurality of portions;
   locating a next available task; and
   allocating the thread to the next available task, wherein the global scheduling queue is enabled to insert tasks into the global scheduling queue to allow the data storage system to execute tasks other than the requested replication.

2. The computer-executable method of claim 1, wherein the portion of data is divided into 1024 portions.

3. A system, comprising:
   a data storage system including a production site and a remote site; and
   computer-executable program logic encoded in memory of one or more computers in communication with the data storage system for scheduling replication on the data storage system, wherein the computer-executable program logic is configured for the execution of:
   receiving a request to replicate a portion of data stored on the data storage system;
   assigning a task number and a priority level to the request to replicate, wherein the task number is used to track progress of the replication of the portion of data and the priority level is subject to dynamic alteration;
   evenly dividing the portion of data into a plurality of portions;
   correlating the task number to each of the plurality of portions;
   periodically evaluating all incomplete requests to replicate the plurality of portions in order to dynamically adjust the priority level of each of the plurality of portions;
   scheduling replication of each of the plurality of portions within a global scheduling queue, wherein the scheduling of each of the plurality of portions is dynamically based upon the current priority level assigned to each of the plurality of portions;
   allocating a thread to replicate each of the plurality of portions according to the scheduling;
   balancing each task within the global scheduling queue, wherein execution of replication on each of the plurality of portions does not preclude access to the threads for longer than an amount of time to complete one slice of the plurality of portions;
   locating a next available task; and
   allocating the thread to the next available task, wherein the global scheduling queue is enabled to insert tasks into the global scheduling queue to allow the data storage system to execute tasks other than the requested replication.

4. The system of claim 3, wherein the portion of data is divided into 1024 portions.

5. A computer program product for scheduling replication on a data storage system, the computer program product comprising:
   a non-transitory computer readable medium encoded with computer-executable program code, the code configured to enable the execution of:
   receiving a request to replicate a portion of data stored on the data storage system;
   assigning a task number and a priority level to the request to replicate, wherein the task number is used to track progress of the replication of the portion of data and the priority level is subject to dynamic alteration;
   evenly dividing the portion of data into a plurality of portions;
   correlating the task number to each of the plurality of portions;
   periodically evaluating all incomplete requests to replicate the plurality of portions in order to dynamically adjust the priority level of each of the plurality of portions;
   scheduling replication of each of the plurality of portions within a global scheduling queue, wherein the scheduling of each of the plurality of portions is dynamically based upon the current priority level assigned to each of the plurality of portions;
   allocating a thread to replicate each of the plurality of portions according to the scheduling;
   balancing each task within the global scheduling queue, wherein execution of replication on each of the plurality of portions does not preclude access to the threads for longer than an amount of time to complete one slice of the plurality of portions;
   locating a next available task; and allocating the thread to the next available task, wherein the global scheduling queue is enabled to insert tasks into the global scheduling queue to allow the data storage system to execute tasks other than the requested replication.

6. The computer program product of claim 5, wherein the portion of data is divided into 1024 portions.

\* \* \* \* \*